US012699188B2

(12) United States Patent
Brocard et al.

(10) Patent No.: US 12,699,188 B2
(45) Date of Patent: Aug. 4, 2026

(54) SYSTEM AND METHOD FOR BOUNDING A SATELLITE POSITIONING SOLUTION INTEGRITY

(71) Applicant: Swift Navigation, Inc., San Francisco, CA (US)

(72) Inventors: Philippe Brocard, San Francisco, CA (US); Damien Theureau, San Francisco, CA (US); Jan Bolting, San Francisco, CA (US); Isak Tjernberg, San Francisco, CA (US); Sébastien Carcanague, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 257 days.

(21) Appl. No.: 18/537,212

(22) Filed: Dec. 12, 2023

(65) Prior Publication Data

US 2024/0201392 A1     Jun. 20, 2024

Related U.S. Application Data

(60) Provisional application No. 63/432,759, filed on Dec. 15, 2022.

(51) Int. Cl.
*G01S 19/07*          (2010.01)

(52) U.S. Cl.
CPC ................................. *G01S 19/074* (2019.08)

(58) Field of Classification Search
CPC ........ G01S 19/04; G01S 19/07; G01S 19/074; G01S 19/20; G01S 19/43; G01S 19/44
USPC .................................................... 342/357.44
See application file for complete search history.

(56) References Cited

U.S. PATENT DOCUMENTS

| | | | |
|---|---|---|---|
| 6,278,945 | B1 | 8/2001 | Lin |
| 10,018,729 | B2 | 7/2018 | Dunik et al. |
| 10,101,464 | B2 | 10/2018 | Appleford et al. |
| 10,191,157 | B2 | 1/2019 | Dai et al. |
| 10,260,888 | B2 | 4/2019 | Takahashi |
| 10,267,924 | B2 | 4/2019 | Ramanandan et al. |
| 10,274,606 | B1 | 4/2019 | Phan et al. |
| 10,422,885 | B2 | 9/2019 | Dai et al. |
| 10,459,593 | B2 | 10/2019 | Tiwari et al. |
| 10,473,790 | B2 | 11/2019 | Noble et al. |
| 10,564,296 | B2 | 2/2020 | Hide et al. |
| 10,578,747 | B2 | 3/2020 | Grgich et al. |
| 10,627,527 | B2 | 4/2020 | Horn et al. |

(Continued)

FOREIGN PATENT DOCUMENTS

KR          101446427  B1    10/2014

OTHER PUBLICATIONS

Blanch, et al., "Gaussian Bounding Improvements and an Analysis of the Bias-sigma Tradeoff for GNSS Integrity", Proceedings of the 2021 International Technical Meeting of The Institute of Navigation, Jan. 2021, pp. 703-713.

(Continued)

*Primary Examiner* — Brady W Frazier
(74) *Attorney, Agent, or Firm* — Jeffrey Schox; Randy Mehlenbacher

(57)          ABSTRACT

A method can include, or a system can be configured to perform the steps of, receiving satellite signals, determining a monitor condition, determining a monitor performance, determining a residual error magnitude, fitting the residual error magnitude, and determining a positioning solution.

20 Claims, 7 Drawing Sheets

(56) References Cited

U.S. PATENT DOCUMENTS

| | | | |
|---|---|---|---|
| 10,677,933 | B1 | 6/2020 | Gavrilets et al. |
| 10,690,775 | B2 | 6/2020 | Jokinen |
| 10,802,160 | B2 | 10/2020 | Dai et al. |
| 10,809,388 | B1 | 10/2020 | Carcanague et al. |
| 10,871,579 | B2 | 12/2020 | Segal et al. |
| 10,901,096 | B2 | 1/2021 | Thrasher et al. |
| 11,035,961 | B2 | 6/2021 | Horn et al. |
| 11,131,774 | B2 | 9/2021 | Miya et al. |
| 11,143,762 | B2 | 10/2021 | Takahashi et al. |
| 11,156,718 | B2 | 10/2021 | Takeda |
| 11,187,813 | B2 | 11/2021 | Brandl et al. |
| 11,221,418 | B2 | 1/2022 | Sleewaegen et al. |
| 11,237,276 | B2 | 2/2022 | Kleeman |
| 11,255,976 | B2 | 2/2022 | Strobel et al. |
| 11,259,141 | B2 | 2/2022 | Li et al. |
| 11,300,689 | B2 | 4/2022 | Noble et al. |
| 11,327,182 | B2 | 5/2022 | Zalewski et al. |
| 11,333,772 | B2 | 5/2022 | Del Regno et al. |
| 11,378,699 | B2 | 7/2022 | Segal et al. |
| 11,422,269 | B2 | 8/2022 | Ookubo et al. |
| 11,422,271 | B2 | 8/2022 | Talbot et al. |
| 11,550,067 | B2* | 1/2023 | Reimer .................. G01S 19/43 |
| 11,774,602 | B1 | 10/2023 | Laine et al. |
| 12,415,525 | B1 | 9/2025 | Automata et al. |
| 2010/0164788 | A1 | 7/2010 | Ghaida |
| 2011/0254730 | A1 | 10/2011 | Mcburney |
| 2013/0099967 | A1 | 4/2013 | Ramasubramanian et al. |
| 2017/0322313 | A1* | 11/2017 | Revol .................. G01S 19/396 |
| 2018/0259651 | A1 | 9/2018 | Antoni et al. |
| 2019/0056510 | A1 | 2/2019 | De Groot et al. |
| 2019/0204450 | A1* | 7/2019 | Revol .................. G01S 19/252 |
| 2019/0339396 | A1* | 11/2019 | Turunen .................. G01S 19/20 |
| 2020/0065172 | A1 | 2/2020 | Menzel et al. |
| 2021/0072407 | A1 | 3/2021 | Talbot et al. |
| 2021/0239845 | A1 | 8/2021 | Sheret et al. |
| 2021/0248910 | A1 | 8/2021 | Fries |
| 2022/0018969 | A1 | 1/2022 | Fine et al. |
| 2022/0283314 | A1 | 9/2022 | Luo et al. |
| 2023/0003897 | A1 | 1/2023 | Kilian et al. |
| 2025/0284009 | A1 | 9/2025 | Abdelhameed |

OTHER PUBLICATIONS

Chen, et al., "New Tools for Network RTK Integrity Monitoring", Proceedings of the 16th International Technical Meeting of the Satellite Division of The Institute of Navigation (ION GPS/GNSS 2003) Sep. 9-12, 2003 Oregon Convention Center, Portland, OR, Abstract only.

Cinque, et al., "Experimental Validation of a High Precision GNSS System for Monitoring of Civil Infrastructures", Sustainability 2022, 14, 10984. https://doi.org/10.3390/su141710984.

Liu, et al., "Evaluation of Satellite Clock and Ephemeris Error Bounding Predictability for Integrity Applications", Proceedings of the 35th International Technical Meeting of the Satellite Division of The Institute of Navigation (ION GNSS+ 2022), Denver, Colorado, Sep. 2022, pp. 34-43.

Liu, et al., "Investigation into Satellite Clock and Ephemeris Errors Bounding Uncertainty and Predictability", Proceedings of the 2022 International Technical Meeting of The Institute of Navigation, Long Beach, California, Jan. 2022, pp. 252-272.

Engler, et al., "Exokemel: An Operating System Architecture for Application-Level Resource Management,", 1995, https:// pdos. csail.mit.edu/6.828/2008/readings/engler95exokemel.pdf (Year: 1995).

Mitchell, et al., "Using One-Sided ROMA Reads to Build a Fast, CPU-Efficient Key-Value Store".

Sabatini, "Avionics-based GNSS integrity augmentation synergies with SBAS and GBAS for safety-critical aviation applications", 2016 IEEE/AIM 35th Digital Avionics Systems Conference (DASC), Sacramento, CA, USA, 2016, pp. 1-10, doi: 10.1109/DASC.2016. 7778076. (Year: 2016).

Stanford, et al., "Chapter 14 Satellite Based Augmentation Systems (SBAS)", 2019, Stanford University GPS Lab, https:// web.stanford. edu/group/scpnUgpslab/pubs/books/Chapter14SBAS. pdf (Year: 2019).

Walter, et al., "Integrity Lessons from the WAAS Integrity Performance Panel (WIPP)", Stanford University, 2003, https:// web. stanford .edu/group/scpnUgpslab/pubs/papers/Walter _10 N NTM_ 2003. pdf (Year: 2003).

\* cited by examiner

S200

Bound(IR)

S500

$\mu+k_{max}{}^{*}\sigma$ $\mu+k_{min}{}^{*}\sigma$ $\mu$

NormINV(IR/2)

SYSTEM AND METHOD FOR BOUNDING A SATELLITE POSITIONING SOLUTION INTEGRITY

CROSS-REFERENCE TO RELATED APPLICATIONS

This application claims the benefit of U.S. Provisional Application No. 63/432,759 filed 15 Dec. 2022, which is incorporated in its entirety by this reference.

TECHNICAL FIELD

This invention relates generally to the GNSS positioning field, and more specifically to a new and useful system and method in the GNSS positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
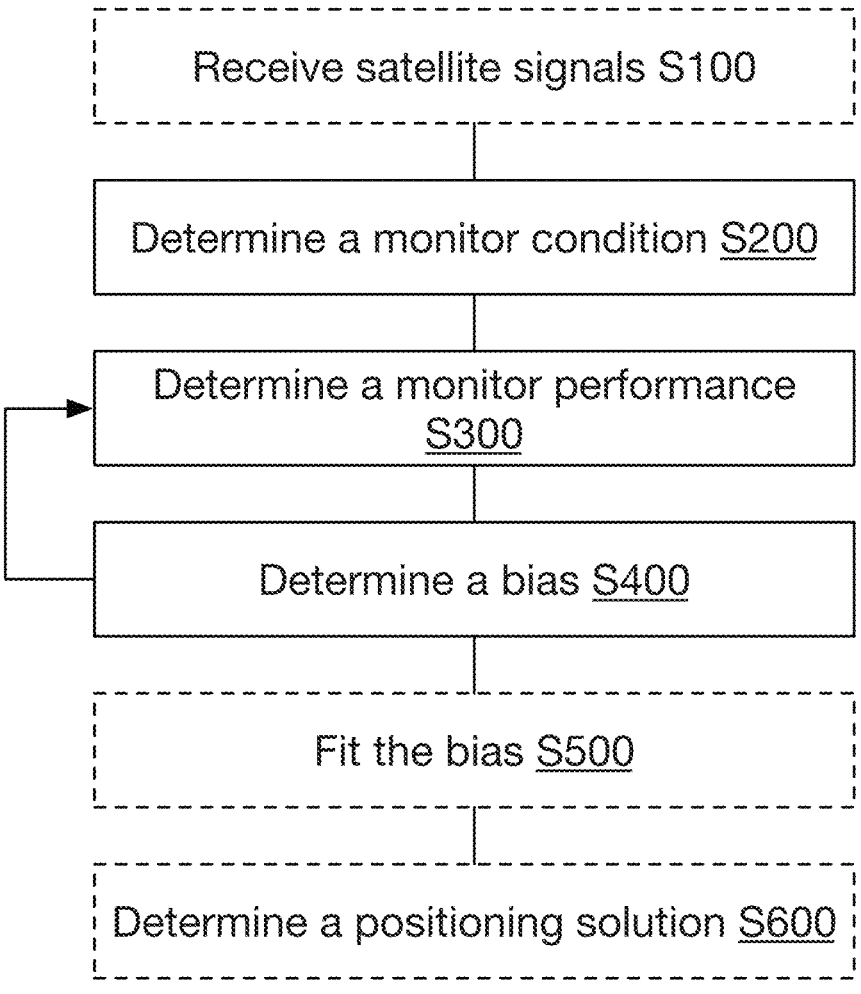
FIG. 1 is a schematic representation of an embodiment of the method.

As shown in FIG. 1, the method can include receiving satellite signals S100, determining a monitor condition S200, determining a monitor performance S300, determining a bias S400, fitting the bias S500, and determining a positioning solution S600.

The method preferably functions to determine protection level bounds for the positioning solution and/or bounds for GNSS corrections generated by a GNSS corrections generator. The bounds (e.g., corrections bounds, protection level bounds, etc.) can depend on an integrity risk, an application of the positioning solution (e.g., use case, external system a GNSS receiver is mounted, connected, etc. to), the integrity monitor condition (e.g., number of satellites in view, number of satellite constellations in view, satellite geometry, number of reference receivers such as base stations providing satellite observations, monitor model(s), etc.), a probability of missed detection of an error (or other feared event or predetermined event), a probability of a false alarm, availability of the GNSS positioning solution, and/or based on any suitable information. However, the method can additionally or alternatively function in any manner.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system.

2. Benefits

Variations of the technology can confer several benefits and/or advantages.

First, variants of the technology can enable a protection level bound to be determined without extensive characterization of a probability distribution for an error to occur. For instance, to achieve a six sigma confidence requires an absolute minimum of about one million datapoints characterizing the true probability distribution (as six sigma references to at most 3 errors per million events). To achieve lower integrity risks (e.g., integrity levels of $10^{-7}$/hr, $10^{-8}$/hr, $10^{-9}$/hr, etc.) would require commensurately more data. The inventors have discovered that instead of extensively characterizing the true probability distribution, comparable performance can be achieved by determining a bound on the magnitude of error that can be monitored with a target probability of missed detection of an error and target (e.g., sufficiently small) probability of false alarm. For example, in some variations, the invention can include providing a bound on the error that depends on a condition of a monitor (rather than a bound that is independent of the monitor or monitor condition).

Second, the inventors have found that rather than treating $\mu$ and $\sigma$ as physical parameters representing a mean and standard deviation of a bounding (e.g., overbounding) distribution of the actual error chain distribution, $\mu$ and $\sigma$ can be used as optimization parameters. By treating $\mu$ and $\sigma$ as optimization parameters, they can address different integrity risks and/or can avoid one penalizing the other due to flag messages or checks (e.g., with the constraint of the risks being covered by a single monitor and/or single flag message channel). Moreover, treating $\mu$ and $\sigma$ as optimization parameters can be beneficial as overbounding the actual error chain distribution can be costly and difficult to do (e.g., because of the need for reference products, because of the amount of reference data necessary, requirements on the analysis tools, etc.).

Third, variants of the technology can enable a single set of bounding parameters to be transmitted to GNSS receivers with different integrity needs (and scaled to the correct integrity risk). For example, the same bounds can be transmitted to (and/or used to determine protection levels for)

GNSS receivers that have differing IR such as a first GNSS receiver with a target integrity risk of about $10^{-4}$/hr and a second GNSS receiver with a target integrity risk of about $10^{-8}$/hr. Relatedly, instead of monitoring GNSS corrections for a plurality of different integrity risk allocations, by generating a bound represented by a fitting function can enable the GNSS corrections to be monitored with respect to a plurality of different allocated integrity risks simultaneously (and without being significantly overly conservative such as not overbounding by more than about 1.1×, 1.05×, 1.01×, 1.005×, or other suitable multiplier of a more accurate bound for a specific allocated integrity risk particularly, but not exclusively, when the fitting function is valid on a restricted integrity risk range such as $10^{-4}$/h to $10^{-8}$/hr).

However, variants of the technology can confer any other suitable benefits and/or advantages.

3. System

The system preferably functions to perform the method (e.g., as described below). However, the system can additionally or alternatively function to determine a GNSS receiver positioning solution (e.g., position, velocity, higher order derivatives of position with respect to time, etc.) and/or can otherwise function.

Figure 10:
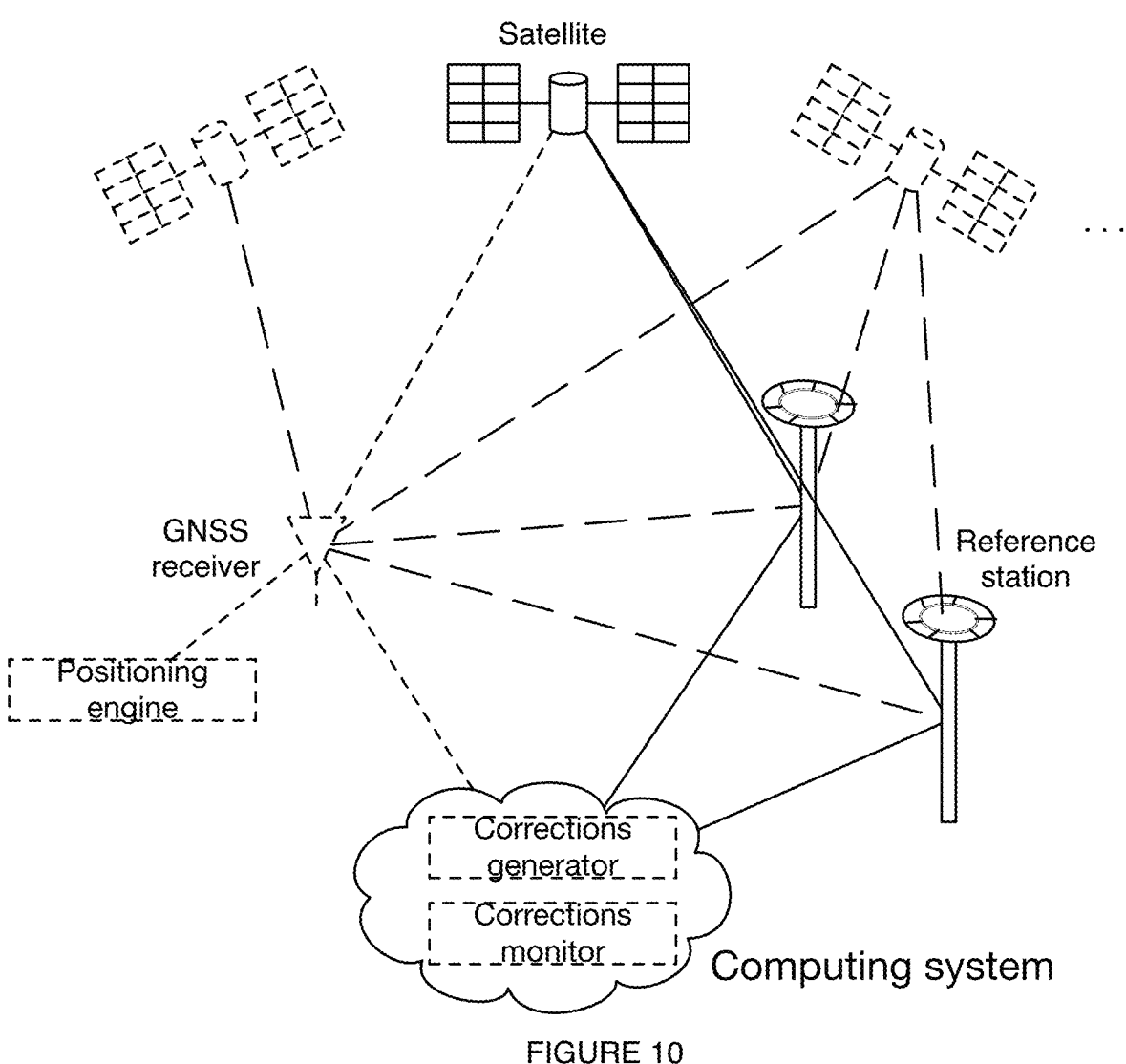
FIG. 10 is a schematic representation of an exemplary system.

As shown for example in FIG. 10, the system can include a computing system. The system can optionally include one or more GNSS receivers, one or more sensors, and/or any suitable components. The computing system can include, for example, a correction generator, one or more integrity monitor (e.g., correction monitor, correction checker, etc.), a fusion engine (e.g., to fuse a positioning solution derived from satellite signals with a positioning solution derived from IMMU sensors or other positioning sources such as a fusion engine as described in U.S. patent application Ser. No. 18/115,963 titled 'SYSTEM AND METHOD FOR FUSING SENSOR AND SATELLITE MEASUREMENTS FOR POSITIONING DETERMINATION' filed 18 Aug. 2023 and/or U.S. patent application Ser. No. 18/073,304 titled 'SYSTEM AND METHOD FOR FUSING DEAD RECKONING AND GNSS DATA STREAMS' filed 1 Dec. 2022 each of which is incorporated in its entirety by this reference), a positioning engine, and/or any suitable components (e.g., a positioning engine, integrity modules, etc.).

The system can be in communication with one or more data sources (e.g., satellites, reference stations, etc.). Examples of data sources include GNSS receivers (e.g., processors, computing systems, etc. connected to an antenna), reference stations (e.g., base stations, monitor stations, etc. such as GNSS receivers that are typically at a fixed, known location), sensors, satellites, databases, and/or any suitable data source can be used.

The set of satellite signals can include orbital data, timestamp, range rate data, carrier phase data, pseudorange data, doppler data, and/or any suitable data. The set of satellite signals can be associated with metadata (e.g., ephemeris), and/or any suitable data. The set of satellite signals can include satellite signals corresponding to satellites from one or more satellite constellation (e.g., Global Positioning System (GPS), GLObal Navigation Satellite System (GLONASS), BeiDou positioning System (BDS), Galileo, Navigation with Indian Constellation (NavIC), Quasi-Zenith Satellite System (QZSS), GPS Aided Geo Augmented Navigation (GAGAN), etc.). The set of satellite signals can additionally or alternatively include any suitable data.

In variants of the system that receive information from more than one GNSS receiver (e.g., more than one antenna), each GNSS receiver can provide the same or different data (e.g., information associated with the same or different satellites, information associated with the same satellite epoch, etc.). For example, different GNSS receivers can be configured to receive satellite observations associated one or more satellite constellations, one or more carrier frequencies (e.g., the L1, L2, L5, E1, E5a, E5b, Eab, E6, G1, G3, B1, B2, B3, LEX, etc. frequencies), and/or corresponding to any suitable data.

The computing system preferably functions to perform all or part of the method (e.g., as described below) and/or process data (e.g., satellite observations, reference station observations, sensor data, etc.) received by the GNSS receiver(s) and/or the sensor(s), but can otherwise function (e.g., to generate operating instructions for an external system or rover based on the positioning solution). The computing system can: aggregate the data (e.g., combine the receiver satellite observations, reference station satellite observations, satellite corrections, and/or sensor data; reorganize the receiver satellite observations, reference station satellite observations, and/or sensor data such as based on the timestamp, time of transmission, time of receipt, etc.; etc.), filter the data (e.g., to calculate state vectors, ambiguities such as phase ambiguities, etc. associated with the data), determine GNSS corrections, monitor (e.g., check) the GNSS corrections, combine the GNSS corrections (e.g., when corrections are monitored more than once), determine ambiguities (e.g., carrier phase ambiguities such as to a floating-point value, integer value, best integer equivariant, etc.) in the satellite observations, calculate the receiver position (e.g., based on the ambiguities, based on a relative pose between the GNSS receiver(s) and/or sensor(s), etc.), calculate the external system location (e.g., based on a pose difference between the GNSS receiver(s) and the external system reference point, based on a pose difference between the sensor(s) and the external system reference point, etc.), correct the data (e.g., correct the satellite observations for clock errors, orbit errors, hardware bias, atmospheric delays, etc. such as based on corrections received from a corrections service), detect faults (e.g., feared events, predetermined events, etc.), and/or can process the data in any suitable manner. The computing system can be local (e.g., to the rover, to the GNSS receiver, to an external system supporting the GNSS receiver, to a reference station, to a sensor, etc.), remote (e.g., cloud computing, server, networked, etc.), and/or otherwise distributed. Typically, different computing system components (e.g., corrections generator, corrections monitor, positioning engine, etc.) each operate on separate and distinct processors (e.g., microprocessors, CPU, GPU, TPU, FPGA/ASIC, etc.). However, one or more computing system components can operate on the same processor.

In variants of the computing system, the computing system includes a correction generator, one or more monitor(s), one or more bounding module(s) (e.g., error module, bias module, REM module, etc.), one or more combiner(s), and/or a positioning engine (e.g., a client positioning engine, a positioning engine operating on a processor collocated with the GNSS receiver, etc.). However, the computing system can include any suitable components.

The correction generator preferably functions to determine (e.g., estimate, calculate, generate, filter, identify, etc.) GNSS corrections, where the GNSS corrections can be used to determine (e.g., facilitate, improve determination of, etc.)

the GNSS receiver positioning solution (e.g., to achieve a target accuracy such as 1 mm, 5 mm, 1 cm, 5 cm, 10 cm, 50 cm, 1 m, etc. accuracy; to achieve a target integrity such as a total integrity risk<$10^{-8}$/hr, $10^{-7}$/hr, $10^{-6}$/hr, $10^{-5}$/hr, etc.; etc.). However, the GNSS corrections can otherwise be used. The correction generator is preferably implemented in a remote computing environment (e.g., in a cloud computing server). However, the correction generator can be implemented in any suitable computing environment (e.g., distributed between different servers, distributed between a local and remote computing system, on a local computing system, etc.). The GNSS corrections can include one or more of: satellite orbit corrections, satellite clock corrections, satellite code bias corrections, satellite phase bias corrections, atmospheric delays (e.g., ionosphere corrections such as slant total electron count (STEC) corrections, ionospheric gradients, second-order ionospheric delay, etc.; tropospheric delays such as hydrostatic delay, wet delay, etc.; etc. which can be provided as gridded corrections, mapped corrections, etc.), gridded corrections (e.g., STEC residuals, troposphere delays, etc. such as disclosed in U.S. patent application Ser. No. 17/833,560 titled 'SYSTEM AND METHOD FOR DETERMINING GNSS POSITIONING CORRECTIONS' filed 6 Jun. 2022 and/or U.S. patent application Ser. No. 18/117,879 titled 'SYSTEM AND METHOD FOR PROVIDING GNSS CORRECTIONS' filed 6 Mar. 2023 each of which is incorporated in its entirety by this reference), user range accuracy (URA) (e.g., information about the estimated accuracy of the corrections for each satellite or satellite constellation), correction points (e.g., correction point coordinates or grid for which gridded corrections are valid such as disclosed in U.S. patent application Ser. No. 17/833,560 titled 'SYSTEM AND METHOD FOR DETERMINING GNSS PROSITIONING CORRECTIONS' filed 6 Jun. 2022 and/or U.S. patent application Ser. No. 18/117,879 titled 'SYSTEM AND METHOD FOR PROVIDING GNSS CORRECTIONS' filed 6 Mar. 2023 each of which is incorporated in its entirety by this reference), and/or any suitable corrections (e.g., for any suitable error source(s)).

Figure 9:
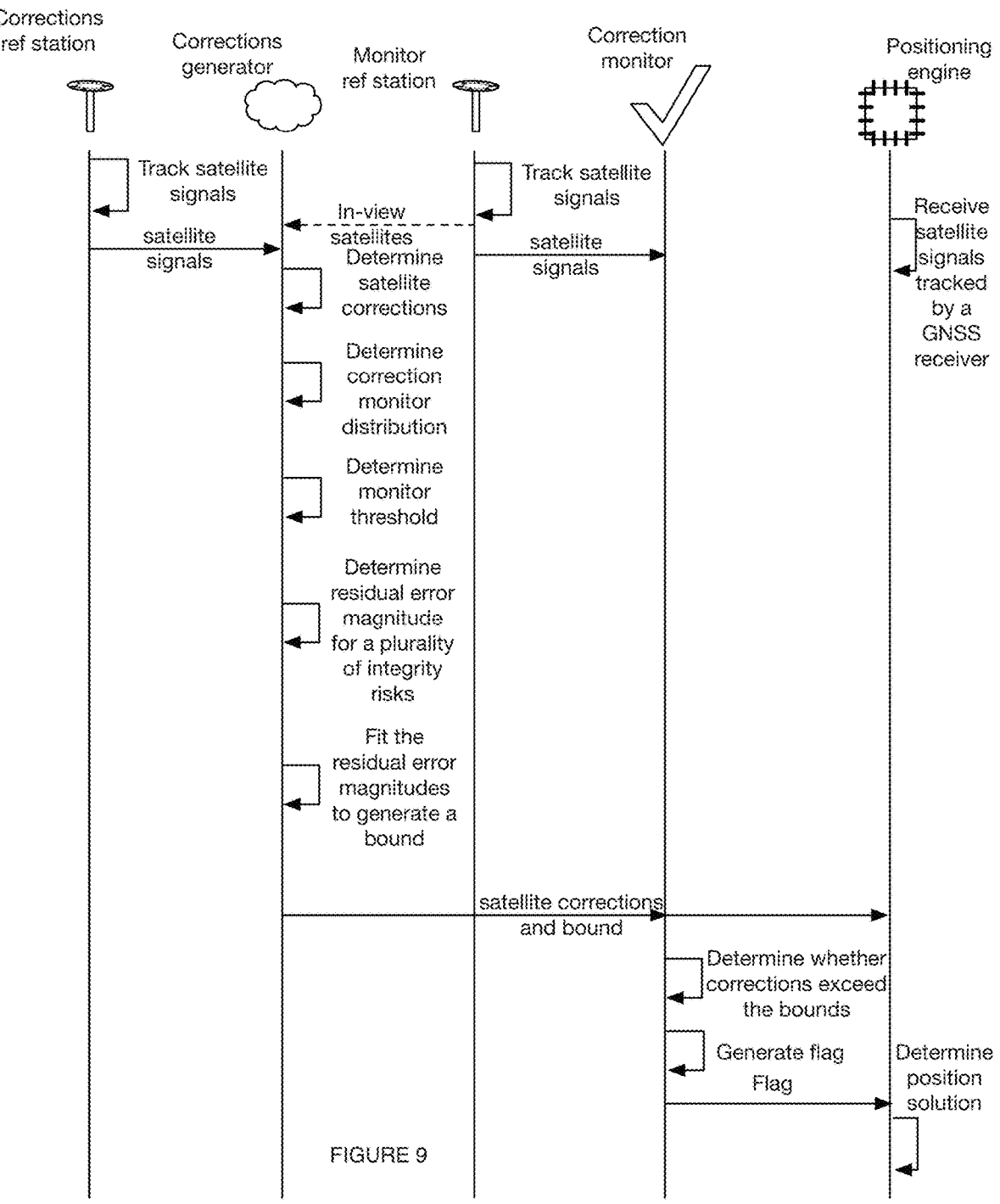
FIG. 9 is a waterfall representation of exemplary data flow in an example of the method.

The GNSS corrections generator can include a bounding module. However, additionally or alternatively, the bounding module can be separate from the GNSS corrections generator. The bounding module preferably functions to determine an error bound for the GNSS corrections. The bounding module (e.g., outputs therefrom) are typically dependent on the quality of (e.g., the sensitivity of) the monitor(s). However, the bounding module can be independent of the quality of the monitor(s) and/or can depend on any suitable information. The bounding module(s) are typically operated in a remote computing environment (e.g., on a server, cloud computing, etc.). For instance, the bounding module can operate within the corrections generator (e.g., the correction generator can include the bounding module) as shown for instance in FIG. 9. However, the bounding module(s) can additionally or alternatively be operated on a local computing system and/or be distributed in any manner (e.g., between different servers, between a local computing system and a remote computing system, etc.).

Figure 2:
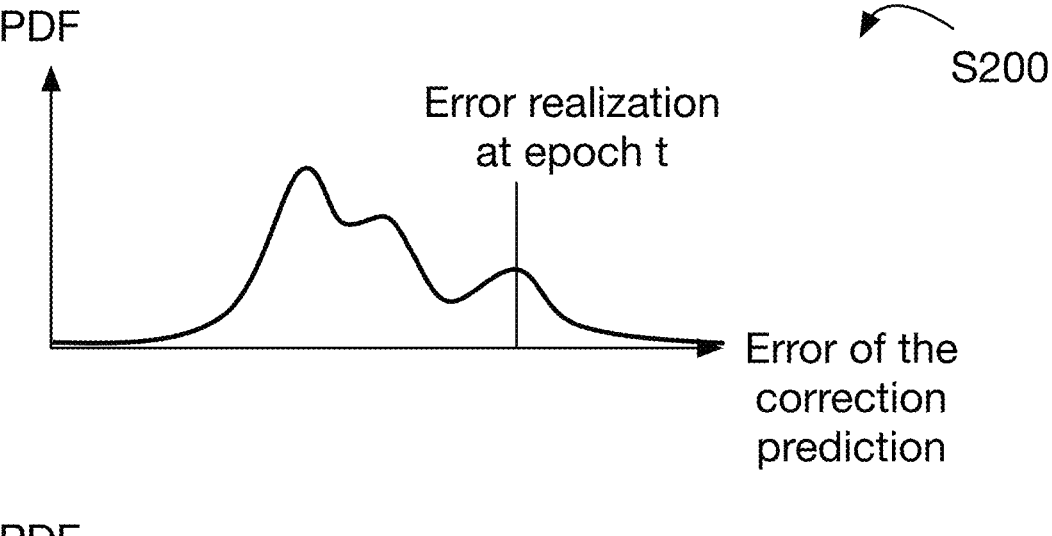
FIG. 2 is a schematic representation of an example of determining a condition of a monitor.
Figure 2:
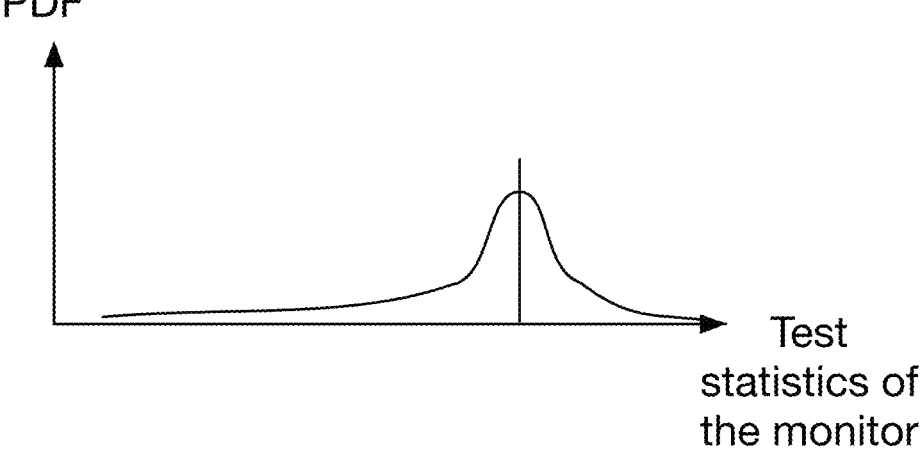

Inputs to the GNSS corrections generator (and/or bounding module thereof) can include: satellite observations (e.g., received from one or more satellites tracked by one or more reference stations associated with one or more satellite constellations), a monitor test statistic (e.g., probability distribution for a test statistic), an integrity risk allocation (which can depend on the GNSS receiver application, data available such as available satellite signals, etc.), a false alarm allocation (which can depend on the integrity risk, monitor quality, etc.), one or more missed detection allocation (which can depend on the integrity risk, monitor quality, etc.), a conditional distribution of a monitor (e.g., as shown for example in FIG. 2), satellites in-view of reference stations providing satellite observations to the monitor (e.g., predicted satellites based on a geolocation of the reference stations and satellite orbits, actual satellites with received signals, etc.) and/or can include any suitable inputs.

Outputs from the corrections generator (and/or bounding module thereof) can include: GNSS corrections, GNSS corrections errors, residual error magnitude (e.g., 'REM,' sometimes referred to as a bias), a bound, a fitting function or fit coefficients associated therewith (e.g., for the bounds such as a fit as a function of integrity risk also referred to as a bounding function), and/or any suitable outputs can be generated.

The GNSS corrections are preferably state space representation (SSR) corrections (e.g., where different error or corrections terms are modeled and distributed separately). However, the GNSS corrections can additionally or alternatively be observation state representation (OSR) corrections (e.g., where error terms are lumped together as an observation such as for a virtual reference station, OSR corrections derived from SSR corrections such as disclosed in U.S. patent application Ser. No. 18/079,640 titled 'SYSTEM AND METHOD FOR CORRECTION SATELLITE OBSERVATIONS' filed 12 Dec. 2022 which is incorporated in its entirety by this reference, etc.) and/or any suitable corrections.

In a first specific example, a corrections generator can generate GNSS corrections by processing satellite observations for each reference station of a set of reference stations to determine (e.g., using a PPP filter) a local (e.g., near the reference station) satellite delay (e.g., atmospheric delay, ionosphere delay, troposphere delay, ionosphere gradient, total electron count, slant electron count, etc.), combining the local satellite delays to generate a nonlocal (e.g., global, nonspatially constrained, etc.) model of the satellite delay, and, optionally, generating tiled satellite delays and/or grid (or other distribution of points) satellite delays (e.g., tiled delays and/or grid delays as described in U.S. patent application Ser. No. 17/833,560 titled SYSTEM AND METHOD FOR DETERMINING GNSS POSITIONING CORRECTIONS' filed 6 Jun. 2022 which is incorporated in its entirety by this reference). In a second specific example, a corrections generation can generate GNSS corrections using a Gaussian model to process satellite observations from a set of reference station observations (e.g., in a manner as described in U.S. patent application Ser. No. 17/554,397 title 'SYSTEM AND METHOD FOR GAUSSIAN PROCESS ENHANCED GNSS CORRECTIONS GENERATION' filed 17 Dec. 2021, which is incorporated in its entirety by this reference). The covariance function of the Gaussian model can depend on the GNSS correction to be determined, a target accuracy of the GNSS correction(s), a target speed to generate the GNSS correction(s), and/or can depend on any suitable aspect. Examples of covariance functions include: constant functions, polynomial (e.g., linear, quadratic, piecewise smooth polynomials, etc.) functions, white noise functions, Kronecker delta (or Dirac delta function) functions, squared exponential functions, Ornstein-Uhlenbeck (e.g., Brownian) functions, (e.g., with variable drift terms that are dependent on the current value of the process), Weiner functions, Matérn functions, Bessel functions, periodic functions, rational (e.g., rational quadratic) functions, $\gamma$-exponential functions, neural network covariance functions, and/or any suitable covariance function. However, any covariance function can be used. In variations of the second specific example, other state estimators (e.g., Kalman filters, unscented Kalman filters, extended Kalman filters, etc.) can be used (e.g., in addition to as an alternative to the Gaussian Process). However, the GNSS corrections can be determined in any manner.

The monitor(s) (e.g., correction monitor, integrity monitor, correction checker, etc.) can function to monitor the corrections and/or satellite observations (such as used to generate the corrections) for one or more predetermined events (e.g., outliers, faults, error sources, etc.). The monitor(s) are typically operated in a remote computing environment (e.g., on a server, cloud computing, etc.). The monitor(s) preferably operated on a separate processor from a correction generator. However, the monitor(s) can operate on the same processor as the correction generator. In variants that include a plurality of monitors, each monitor preferably operates on a distinct processor. However, two or more monitors of the plurality can operate on the same processor (e.g., when the monitors are monitoring unrelated, uncorrelated, etc. feared events). However, the monitor(s) can additionally or alternatively be operated on a local computing system and/or be distributed in any manner (e.g., between different servers, between a local computing system and a remote computing system, etc.).

The monitor(s) can include a feared event monitor, anomalous event monitor, residual monitor, range error monitor, position error monitor, observation monitor, and/or any suitable monitor(s).

Inputs to the monitor(s) can include: satellite observations (e.g., satellite signals, satellite observations from a set of reference stations used for monitoring, satellite observations distinct from satellite observations used for correction generation, etc.), GNSS corrections (e.g., current GNSS corrections, prior GNSS corrections, validated GNSS corrections, GNSS corrections within a threshold time of becoming invalid, etc.), global information (e.g., satellite ephemeris), probabilities (e.g., a probability allocation such as a missed detection allocation, false alarm allocation, etc.), GNSS correction bounds (e.g., residual error magnitude(s), residual threshold(s), bounding function(s), etc.), and/or any suitable inputs can be used.

Outputs from the monitor can include: flags (e.g., indicating a validity or invalidity of the GNSS corrections), and/or any suitable outputs can be generated. Flags can be associated with specific errors, error groups, satellite, satellite constellations, and/or any suitable information. For example, a first flag (e.g., for each satellite) can be used to indicate use or do not use corrections for a satellite orbit, clock, bias (e.g., code bias, phase bias), a second flag can be used to indicate use or do not use corrections for ionosphere delay, and a third flag can be used to indicate use or do use corrections for troposphere delay (e.g., vertical hydrostatic delay, vertical wet delay). However, any suitable flags can be generated (e.g., a single flag for all corrections, a separate flag for each correction, a single flag for all atmospheric delays, a single flag for a satellite constellation, etc.).

In a specific example, a monitor can be configured to ensure (e.g., issue a 'safe to use' flag when the following is met, generate an alarm or 'not safe to use' flag when the following is not met, etc.) P(Error>Bound|NOT DNU) <=Residual Risk+IRallocation, where P(Error>Bound|NOT DNU) is a probability that an error (e.g., correction error) exceeds a bound and a flag (e.g., alarm) is not issued indicating that the error has exceeded the bound, the residual risk is a (potentially constant) such as a minimum risk (e.g., errors resulting from fault), and IRallocation which can be between a minimum and maximum value (e.g., random statistical errors such as in fault free conditions, depending on an application of the GNSS receiver, can depend on satellites in view of reference stations providing satellite observations to the monitor, related to or derived from a bounding function, etc. where the minimum and/or maximum can be $10^{-1}$/h, $10^{-2}$/h, $10^{-3}$/h, $10^{-4}$/h, $10^{-5}$/h, $10^{-5}$/h, $10^{-6}$/h, $10^{-7}$/h, $10^{-8}$/h, $10^{-9}$/h, $10^{-10}$/h, values therebetween, etc.). The residual risk (per satellite, per satellite constellation, per atmospheric effect, etc.) can be represented, for example, as a probability of onset (e.g., probability that an event or fault starts), a probability that at a given instant in time a predetermined event (e.g., fault) is present (which can be related to the probability of onset based on a duration of the predetermined event), and/or can otherwise be represented. In some variants, the residual risk can be set to 0 (e.g., where the IRallocation can account for both nominal and faults). In some variants, the monitor can simultaneously (e.g., without performing separate computations for each value) determine whether P(Error>Bound|NOT DNU)<=Residual Risk+IRallocation is met for a plurality of IRallocation values. The minimum and maximum IRallocation values typically span at most about 4 orders of magnitude of integrity risk (e.g., to optimize for an impact on availability vs overbounding the errors) such as between $10^{-4}$/h and $10^{-8}$/h. However, the minimum and maximum IRallocation values can span any suitable range of values.

A quality (also referred to as condition, sensitivity, etc.) of the monitor can refer to an ability for the monitor to determine that an error has occurred with a greater than threshold confidence (e.g., probability). However, the quality can otherwise be defined. The quality of the monitor can depend on reference station(s) providing data to the monitor (e.g., the number of reference stations, the geographic distribution of reference stations, geometry of satellites relative to a reference station, number of satellite constellations in view of the reference stations, which satellite constellations provide data to the monitor, epoch of satellite observations transmitted to the monitor, GNSS receiver at each monitor refence station, etc.), a datalink (e.g., a data connection between data sources such as between a reference station and the monitor, latency in datalink, a data connection between the monitor and a mobile GNSS receiver, etc.), correction validity time, number of observations available to the monitor (e.g., total number of satellite observations provided to the monitor, number of observations associated with each satellite constellation, number of observations associated with a frequency, etc.), and/or can depend on any suitable information.

Figure 6:
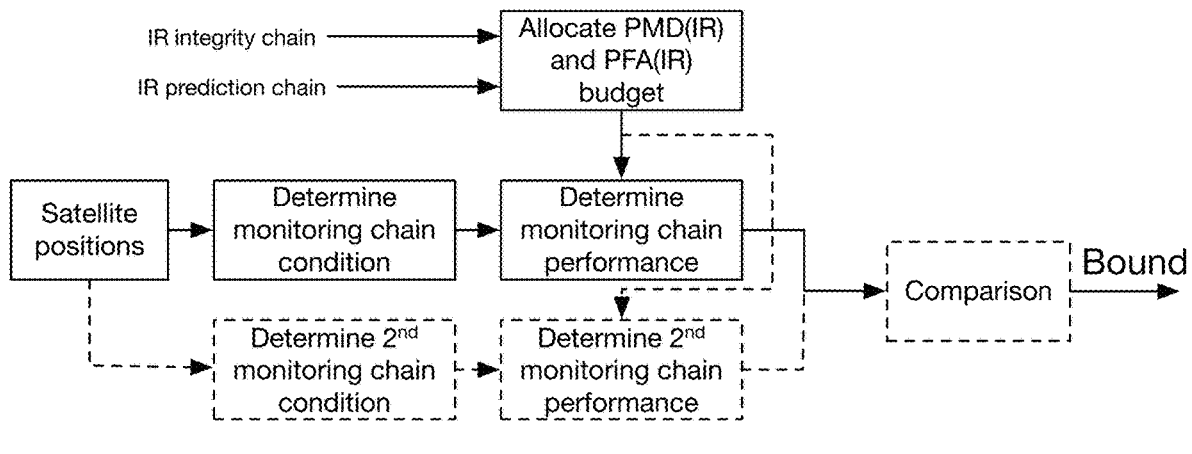
FIG. 6 is a schematic representation of an example of determining bounds when a plurality of monitoring chains are used.

In some variants (e.g., as shown for example in FIG. 6 or FIG. 7), the system can include a plurality of monitors. The plurality of monitors are preferably independent (e.g., use different data sources such as distinct sets of reference stations; use different data such as satellite observations from different epochs, different satellite constellations, different satellites, different frequencies, code or carrier phase, etc.; etc.). However, the plurality of monitors can be interdependent (e.g., use the same data, include a subset of shared data, etc.). As shown for example in FIG. 7, different monitors can have different probability allocations (e.g., different false alarm probability, different missed detection allocation, etc.), which can be beneficial for improving operation of the system (e.g., can result in better (e.g., smaller, tighter, more accurate, etc.) bounds than a naïve (e.g., equal) distribution of the probabilities. The distribution of probability allocation can depend on the number of monitors, the quality of the monitors, the satellite observations available to the monitors, the reference station(s) available to the monitors, a processor bandwidth available to the monitors, and/or any suitable data or information. For instance, a higher false alarm probability can be allocated to a higher quality monitor relative to a lower quality monitor. However, the false alarm probability can be equally allocated (e.g., each chain can be allocated Pfa/2) and/or can be allocated in any suitable manner. In another example, each monitor can have a probability of missed detection allocation that depends on the condition of the respective monitor. The probability allocation can be determined in real or near-real time (e.g., dynamically determined, updated, etc.) and/or with any suitable timing. The probability allocation can be determined, for example, according to simulations from a set of training data (e.g., a database of prior data; simulated satellite observations such as with different reference stations, satellite geometries, satellite constellations, etc.; etc.). As an illustrative example, the probability of a missed detection can be allocated as $IR_{req} = P(Error > Bound$ & no alert$) \geq P(Error > Bound) \cdot P_{MD}(Int$ chain 1$) \cdot P_{MD}(Int$ chain 2$)$, where $P(Error > Bound)$ is the probability that a position error exceeds a bound (e.g., protection level), $P_{MD}(Int$ chain 1$)$ is a probability of missed detection allocated to a first monitor, and $P_{MD}(Int$ chain 2$)$ is a probability of missed detection allocated to a second monitor (e.g., provided that the two chains probability of missed detection are independent events). In variants of this example (as shown for instance in FIG. 8), $IR_{pred}$ can be allocated according to $IR_{pred} = P(Error > Bound) < 10^{-2}/SV/h$, which can be a loose minimum bound (and can be interpreted as requiring the Bound to be sufficiently large with respect to the "$10^{-2}/h$ percentile" of the actual error distribution) and is typically a safe bound as the bounds (e.g., the bounding function, false-alarm driven threshold, midsection driven threshold, etc.) in practice are usually larger than the minimum bound. In another variant of this example, $IR_{pred}$ can be allocated with an a priori probability of 1 for $P(Error > Bound)$ which can be a conservative bound (e.g., leading to larger than necessary bounds). In another variant of this example, the IRreq can be modified to account for a probability of missed detection from both integrity chains being correlated or otherwise not being independent (e.g., include a PMD(intchain1,intchain2) term). However, the integrity risk allocation can be determined in any manner.

When a plurality of monitors is used, the computing system can include a combiner that can function to combine the outputs from a plurality of monitors. The combiner can combine the outputs from the monitors using voting (e.g., between different monitor results), threshold tests (e.g., only issuing a safe to use flag when all monitors indicate that the corrections are safe to use), using a weight average of monitor results, using an average of monitor results, combining the results based on the monitor quality (e.g., weighting a higher quality monitor more, excluding results from monitors with less than a threshold quality, etc.), and/or can combine the outputs in any manner. For example, a combiner can operate in a manner as described in U.S. patent application Ser. No. 18/503,662 titled 'SYSTEM AND METHOD FOR GNSS CORRECTION MONITORING' filed 7 Nov. 2023 which is incorporated in its entirety by this reference.

4. Method

As shown in FIG. 1, the method can include receiving satellite signals S100, determining a monitor condition S200, determining a monitor performance S300, determining a bias S400, fitting the bias S500, and determining a positioning solution S600. The method is preferably performed by a system (e.g., a system as described above), but can be performed by any suitable system. The method is preferably performed in real or near-real time (e.g., as new satellite signals are observed, the method is executed or repeated before a subsequent epoch; as satellite signals are received; during use of the GNSS receiver to determine a positioning solution for a mobile rover; etc.). However, the method can be performed with a delay and/or any suitable timing.

Receiving one or more satellite observations S100 preferably functions to track, measure (e.g., at one or more reference stations, at a GNSS receiver of a rover, etc.), and/or access one or more sets of satellite observations (e.g., carrier phase measurements, pseudo-range measurements, code measurements, doppler measurements, etc.) from one or more observed satellites. The satellite observations are preferably accessed or received by a computing system (e.g., a GNSS receiver computing system, positioning engine, fusion engine, corrections generator, corrections monitor, etc.), but can be accessed by any component. The satellite observations (and/or corrections) can be measured by a set of reference stations (e.g., monitor reference stations, corrections reference stations, etc.), a mobile GNSS receiver, retrieved from a database (e.g., retrieve stored satellite observations; retrieve stored corrections; retrieve an almanac; etc.), and/or be otherwise received. S100 can include receiving Doppler measurement data, reference data, and/or any suitable data. The satellite observations can include signals from one or more satellite constellations. Each set of satellite observations preferably includes satellite observations associated with a plurality of satellite constellations. However, one or more sets of satellite observations can correspond to a single satellite constellation.

The method can optionally include determining GNSS corrections. However, additionally or alternatively, S100 can include receiving GNSS corrections (e.g., where the method can function to determine bounds for the GNSS corrections errors and/or monitor the GNSS corrections) and/or can otherwise access GNSS corrections. Determining GNSS corrections functions to determine (e.g., calculate, estimate, generate, etc.) GNSS corrections that can be used by a GNSS receiver in determining a GNSS receiver positioning solution. The GNSS corrections are preferably determined by a corrections generator (e.g., operating on a cloud computing server, operating on a processor collocated with a GNSS receiver, operating on an external system processor, etc.). However, the GNSS corrections can be determined using any suitable component. The GNSS corrections are preferably determined using a set of reference station observations (e.g., a set of one or more satellite signals received by one or more reference stations). However, the GNSS corrections can additionally or alternatively be determined using prior GNSS corrections, rover observations, sensor data, and/or any suitable data or information.

The GNSS corrections can include bias corrections (e.g., phase bias corrections, code bias corrections, true bias corrections, etc.), clock corrections, orbit corrections, atmospheric delay (e.g., ionospheric delay, tropospheric delay, etc.), antenna phase center, solid earth tides, solid earth pole tides, ocean tidal loading, and/or any suitable corrections.

The GNSS corrections can be determined using a Kalman filter, a Gaussian process, a particle filter, and/or using any suitable estimator. For example, the GNSS corrections can be determined in a manner as disclosed in Ser. No. 17/554, 397 titled 'SYSTEM AND METHOD FOR GAUSSIAN PROCESS ENHANCED GNSS CORRECTIONS GENERATION' filed 17 Dec. 2021 and/or U.S. patent application Ser. No. 17/347,874 titled 'SYSTEMS AND METHODS FOR DISTRIBUTED DENSE NETWORK PROCESSING OF SATELLITE POSITIONING DATA' filed 15 Jun. 2021, each of which is incorporated in its entirety by this reference. However, the GNSS corrections can be determined in any manner.

Determining a monitor condition S200 can function to determine a condition or quality of a monitor and/or each monitor (e.g., in variants that include a plurality of monitors). S200 is preferably performed by a corrections generator (e.g., a bounding module thereof). S200 can additionally or alternatively be performed by any suitable component (e.g., an integrity monitor when an integrity monitor is used to generate the bounds). S200 is preferably performed without directly receiving information from the monitor and/or reference stations or other data sources providing information to the monitor. However, S200 can include receiving information from the monitor(s) and/or reference stations or other data sources providing information to the monitor.

Figure 7:
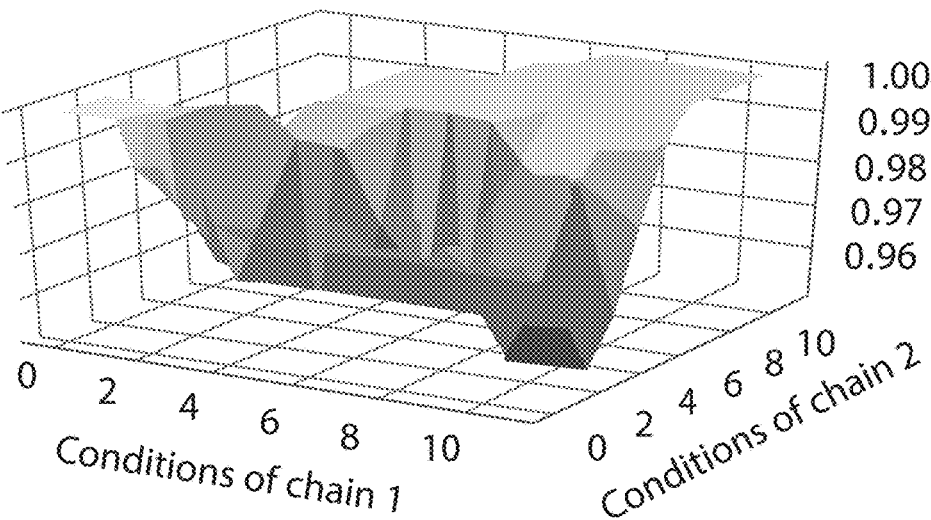
FIG. 7 is a schematic representation of an example of bound performance (and potential bound performance enhancement by unevenly allocating a probability of false alarm or misdetection between the monitors) when a plurality of monitors are used.
Figure 8:
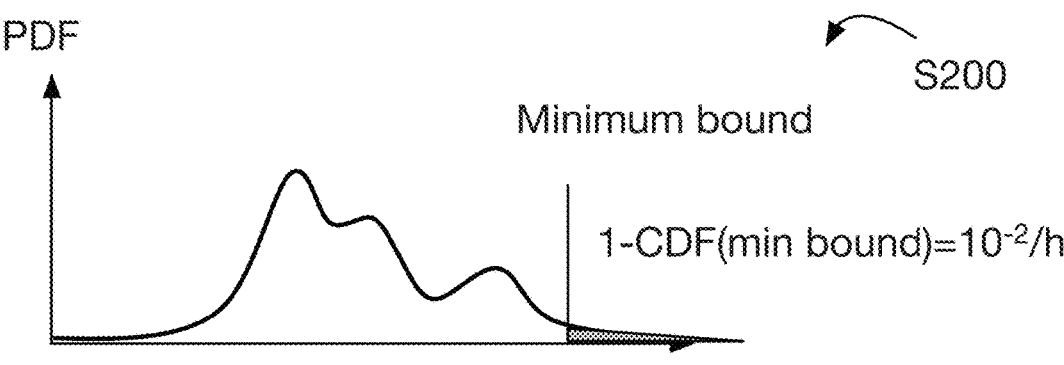
FIG. 8 is a schematic representation of an exemplary minimum bound.

The condition can be a numerical value (e.g., a normalized value such as between 0 and 1, a non-normalized value as shown for example in FIG. 7, a value associated with a number of satellites in view of a reference station (e.g., providing satellite observations to a monitor), a value associated with a geometry of satellites in view of a reference station, etc.), a classification, a qualitative value (e.g., 'good', 'acceptable', 'bad', 'N/A', etc.), a dilution of precision (or be derived therefrom), a conditional distribution of the monitor, and/or can have any suitable value or moniker. The quality of the monitor can depend on the application and/or use case of the GNSS receiver. As an illustrative example, a GNSS receiver with tighter vertical protection level tolerances needs can identify monitor(s) that receive a greater number of observations from reference stations with satellites near overhead (e.g., with elevation angle between about 70 and 90°) as higher quality than the same monitor would be rated for horizontal protection level needs.

The monitor condition is preferably determined based on the reference stations (e.g., number of reference stations, geographic distribution of reference stations, number of satellites in view of each reference stations, geometry of satellites in view of the reference stations, etc.) that provide satellite observations to the monitor. However, the monitor condition can additionally or alternatively be determined in any manner.

Determining the monitor condition can include determining a conditional distribution of the monitor based on the residual correction error. As shown for example in FIG. 2, the conditional distribution of the monitor can be determined for the unknown actual error distribution by observing an error at an epoch and determining a monitoring metric distribution centered on the error (e.g., the conditional distribution of the monitor). Typically, a Gaussian distribution is used. However, additionally or alternatively, a Cauchy distribution, Lévy distribution, Voight distribution, generalized normal distribution, logistic distribution, Laplace distribution, hyperbolic secant distribution, Landau distribution, and/or other suitable distribution can be used. However, the conditional distribution of the monitor can be determined in any manner. The conditional distribution can be determined by determining an average distribution for an observable error state distribution for the reference station observables, a linear combination of distributions for an observable error state distribution for the reference station observables (e.g., weighted based on the line-of-sight vector between the satellite and reference station, weighted based on feared events such as multipath or cycle slips, etc.), determined using simulations (e.g., monte carlo simulations) of error distributions for the reference stations (e.g., in different satellite configurations), and/or can otherwise be determined. Additionally or alternatively, the actual error distribution of the monitor can be determined and used (e.g., based on a characterization of the monitor to at least achieve the most stringent integrity risk to be fit).

Determining a monitor threshold S300 functions to determine one or more threshold, where the threshold can be used to determine the REM (e.g., in S400). S300 is preferably performed by a corrections generator (e.g., a bounding module thereof), but can be performed by any suitable component. The threshold can depend on an IR (e.g., a target IR, IR allocation also stylized IRallocation, etc.), GNSS receiver application, monitor quality, monitor probability allocation (e.g., false alarm probability, misdetection probability, etc.), the conditional distribution of the monitor (e.g., as determined in S200), the actual error distribution of the monitor, the distribution of the residual error correction (e.g., an allocated residual error correction such as $IR_{pred}=P$ (Error>Bound)<$10^{-2}$/SV/h or an a priori probability of 1 for P(Error>Bound); the actual residual error correction; an overbounding function of the actual residual error correction such as using a normal distribution, Cauchy distribution, Voigt distribution, logistic distribution, skew-normal distribution, Platykurtic distribution, Leptokurtic distribution, etc. used to model the actual residual error correction distribution; etc.), and/or using any suitable information. In variants the use a false alarm probability, the false alarm probability is generally constant (e.g., for different users, for different integrity risks, etc.). However, the false alarm probability can vary (e.g., be different for different integrity risks).

As an illustrative example, the threshold (e.g., a monitor probability of false alarm driven threshold) can be determined based on (e.g., directly computed from, a weighted or scaled value relative to, etc.) a convolution of the distribution of the residual correction error (e.g., $IR_{pred}=P$ (Error>Bound)<$10^{-2}$/SV/h) and the conditional monitor distribution. However, the threshold can otherwise be determined.

Determining an REM S400 functions to determine the REM ('residual error magnitude' also referred to as bias) for an integrity risk value for which the probability of missed detection allocation is met at the threshold (e.g., the false alarm threshold as determined in S300). S400 is preferably performed by a corrections generator (e.g., a bounding module thereof), but can be performed by any suitable component (e.g., a monitor when a monitor generates the bounds). For example, the REM can be determined by comparing an area under the conditional (or actual) distribution (e.g., computed by integrating the probability density function) between two limits (e.g., where one limit can be the REM and the other limit can be the threshold, approximately infinity, a conservative bound, an aggressive bound, a $P_{md}$ allocation for the integrity risk, an area as shown for example in FIG. 3, etc.). However, the REM can otherwise be determined.

Figures 3, 4:
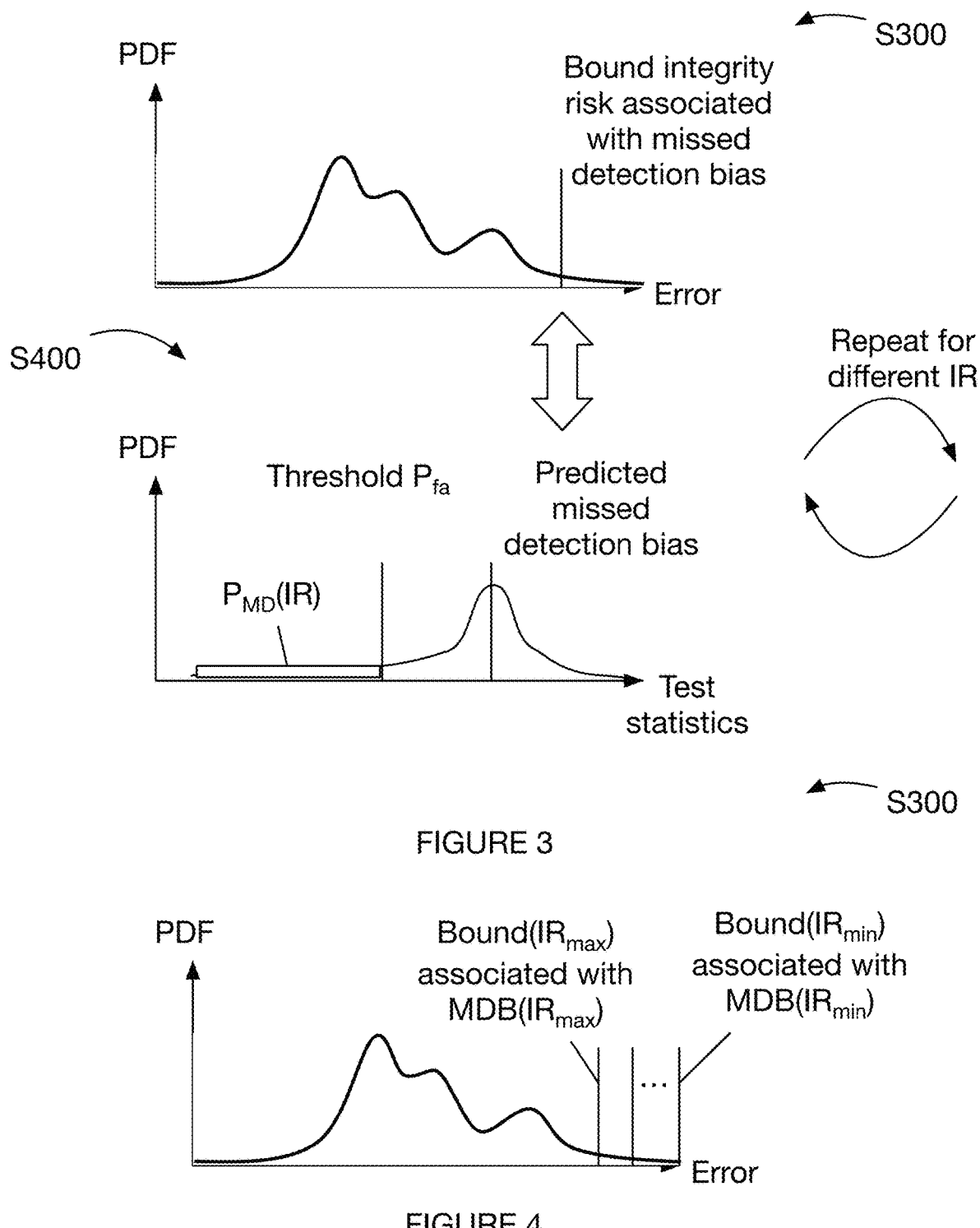
FIG. 3 is a schematic representation of an example of iteratively determining bounds for different integrity risks.
FIG. 4 is a schematic representation of an example of a bound for different integrity risks.

As shown for example in FIGS. 3, S300 and S400 are preferably performed iteratively (e.g., successively) for each allocated integrity risk (e.g., between a minimum and maximum integrity risk) to determine an REM associated with each allocated integrity risk (as shown for example in FIG. 4). The iterations can be computed in parallel (e.g., contemporaneously) or in sequence. The IR (integrity risk) can be allocated evenly (e.g., in linear values of IR, in logarithmic values of IR, etc.) or unevenly (e.g., greater density for regions that are more sensitive to IR changes, for regions that require more accurate fitting or assurance of overbounding of the bound, etc.). As an illustrative example, the REM can be determined for each integrity risk of $10^{-4}$/h, $10^{-5}$/h, $10^{-6}$/h, $10^{-7}$/hr, and $10^{-8}$/hr. However, any suitable integrity risk(s) can be evaluated. Each iteration is preferably performed in the same manner. However, different iterations can be performed in different manners (e.g., using different conditional probability distributions, different probability allocations, etc.).

Fitting the REM S500 preferably functions to fit the REM as a function of integrity risk to a fitting function, where coefficients of the fitting function can be used, for instance, to determine the protection levels. S500 is preferably performed after S300 and S400 (e.g., after iterations between S300 and S400 are complete). However, S500 can be performed with any suitable timing. S500 is preferably performed by a corrections generator (e.g., a bounding module thereof), but can be performed by any suitable component (e.g., of a computing system, monitor, etc.).

Figure 5:
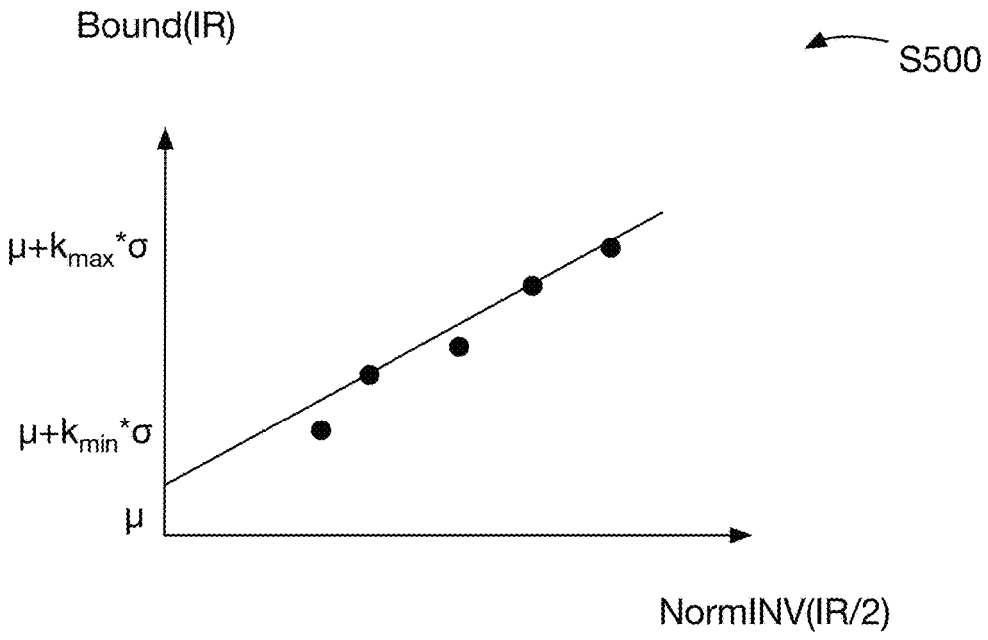
FIG. 5 is a schematic representation of an example of fitting bounds for different integrity risk.

The REM fit is preferably constrained such that the fit overbounds all data REM values that are computed (as shown for example in FIG. 5). For instance (e.g., for a linear fit), the REM fit can exactly intersect one or two REM values (with other REM values below the fit). While overbounding will result in overly conservative bounds for some integrity risks, it ensures that safety is achieved for all integrity risks. However, the REM fit can be constrained to achieve a constant false alarm probability (e.g., for all integrity risks), a constant misdetection probability (e.g., for all integrity risks), can be unconstrained (e.g., achieve a best fit for the REM data which can result in underbounding for some integrity risks), and/or can otherwise be constrained or unconstrained.

The REM are preferably fit using linear regression (e.g., the REM is fit to a line, as shown for example in FIG. 5, etc.). However, the REM can additionally or alternatively be fit using nonlinear regression (e.g., fit to a polynomial with order greater than 1 such as a parabola, cubic function, quartic function, etc.; fit to an exponential function; fit to a logarithm; fit to a rational function; fit to a power function; etc.), using a logistic regression (e.g., fit to a sigmoid function), and/or can be fit in any suitable manner. The fit can be evaluated (e.g., optimized) using a least squares model (e.g., linear least squares, nonlinear least squares, weighted least squares, etc.), least absolute deviation, mean square error, an error-in-variables model, multivariate least squares, and/or using any suitable evaluation criterion or method. The fitting coefficients can be referred to, for instance, as $\mu$ and $\sigma$ that satisfies REM (IR)$\leq\mu+$K(IR)$\cdot\sigma$ for any value of IR between a minimum IR and a maximum IR and where K(IR) is a scaling factor that depends on an integrity risk (e.g., an integrity risk allocation, a target integrity risk, an integrity risk that depends on an application of the GNSS receiver, etc.). K(IR) can depend on an assumed probability distribution function (e.g., conditional probability distribution function used for a monitor). As an illustrative example (for a two tailed distribution), $$K(IR) = \left\| ppf\left(\frac{TIR}{2}\right)\right\|$$

where ppf is the percent point function or the inverse of the cumulative distribution (e.g., K(IR) the number of $\sigma$ or standard deviations that equal the target integrity risk for a normal distribution). For instance, to determine REM on a range of $10^{-4}$/hr to $10^{-8}$/hr, K(IR) is between about 3.89 and about 5.74. However, K can additionally or alternatively be about 1.64, about 1.95, about 2.57, about 3.29, about 4.42, about 4.90, about 5.33, about 5.73, about 6.11, about 6.47, about 6.81, values or ranges there between, greater than 6.81, or less than 3.89. Although in some variants $\mu$ and $\sigma$ can be related to a mean and standard deviation or variance of a probability distribution (e.g., a probability distribution overbounding the error distribution), in general the $\mu$ and $\sigma$ of this example are not related to a probability distribution (i.e., are more accurately considered an offset and scale or slope factor, can achieve negative values, etc.).

The method can include monitoring the GNSS corrections (e.g., to determine whether the computed corrections errors are less than a threshold residual error magnitude i.e., REM, with the target missed detection probability and false alarm probability). Monitoring the GNSS corrections is preferably performed by an integrity monitor (e.g., operating on a cloud computing server, operating a monitoring station, operating on a computing system collocated with a GNSS receiver, etc.), but can be performed by any suitable component (e.g., by a corrections generator).

Monitoring the GNSS corrections preferably monitors current GNSS corrections (e.g., most recently generated GNSS corrections) as well as previous GNSS corrections (e.g., previous valid GNSS corrections). For example, all GNSS corrections generated within a validity time window can be monitored. Monitoring both current and previous GNSS corrections can provide a technical advantage of identifying abnormal behavior (e.g., by when an error is greater than a threshold, the flag is set to NOT OK for that element) in an element (e.g., a satellite) that can invalidate previous corrections. However, only current GNSS corrections (which may facilitate or enable filtering, separating, isolating, etc. safe to use GNSS corrections from not safe GNSS corrections such as by altering a GNSS corrections message to only include safe GNSS corrections) and/or any suitable GNSS corrections can be monitored.

The corrections are preferably monitored using a set of independent satellite observations (e.g., the monitoring satellite observations are preferably independent of the corrections satellite observations). For example, the monitoring satellite observations can be received at a different set of reference stations than the corrections satellite observations, the monitoring satellite observations can be received during a different epoch than the corrections satellite observations, the monitoring observations can have a different frequency than the corrections frequency (e.g., where the corrections frequency and/or monitoring frequency can be converted to one another in a manner such as disclosed in U.S. patent application Ser. No. 18/241,542 titled 'SYSTEM AND METHOD FOR DETERMINING GNSS CORRECTIONS' filed 1 Sep. 2023 which is incorporated in its entirety by this reference), the monitoring observations can be associated with different satellites and/or satellite constellations from the generating satellite observations, and/or the monitoring satellite observations can otherwise be independent of the satellite observations. However, additionally or alternatively the corrections can be monitored using interdependent satellite observations (e.g., the monitoring satellite observations and the corrections satellite observations can include common satellite observations), the set of corrections satellite observations can include one or more satellite observation that is used to monitor the corrections (e.g., and not used to determine the corrections), and/or the corrections can be monitored using any suitable satellite observations and/or other data.

Monitoring the GNSS corrections can include determining residual values from applying the GNSS corrections to the monitoring satellite observations and comparing the residuals (and/or other corrected reliability reference station observations) to one or more thresholds (e.g., REM, bounding function, etc.). The thresholds can be associated with an integrity bound (e.g., when the residuals meet the threshold the corrections can enable a high accuracy estimated position, integer-valued carrier phase ambiguity determination, intermediate data generation, etc.), a confidence that an integrity bound can be achieved (e.g., a confidence that the corrections can enable a high accuracy estimated position, integer-valued carrier phase ambiguity determination, intermediate data generation, etc.), and/or any suitable results.

When the residual is less than or equal to the threshold, the corrections can be transmitted to and/or used by the positioning engine (e.g., reliability of the corrections can indicate that the corrections are safe to use, will generate an estimated position and/or velocity with a target integrity, an 'ok' integrity flag can be generated, safe GNS corrections can be transmitted, etc.). When the residual is greater than the threshold, the integrity monitor can: generate an integrity flag (e.g., flag, alert, 'NOK,' etc.) indicating that the corrections should not be used (e.g., a not 'ok' alert), generate an integrity flag indicating using the corrections will likely produce an estimate of the position with an integrity or accuracy exceeding a target integrity or accuracy, generate an integrity flag indicating an integrity with which the positioning solution can be generated by using the GNSS corrections, and/or any suitable integrity flags can be generated and/or can be used in any suitable manner (e.g., not be transmitted to the positioning engine). The integrity flags (e.g., flag) can be associated with a validity set of corrections, individual corrections data, subsets of validity set of corrections, and/or any suitable corrections.

In some variants, monitoring the GNSS corrections can include monitoring a change in the residuals over time (e.g., to detect drift that may affect velocity estimation). When the change in the residuals over time is greater than the threshold, an integrity flags (e.g., flag) can be generated indicating that the corrections should not be used (e.g., for velocity estimation), an integrity flag can be generated indicating an estimated accuracy and/or integrity for a positioning solution generated using the corrections, and/or any suitable integrity flags can be generated and/or the corrections can be used in any manner (e.g., not be transmitted).

S500 can include transmitting the fitting coefficients (e.g., fit function, bounding function) to the GNSS receiver, transmitting a protection level (e.g., determined in a manner as described in S600) to the GNSS receiver, and/or can include any suitable manner for providing the REM (e.g., as fit coefficients) to the GNSS receiver. S500 can optionally include transmitting GNSS corrections, age of integrity information (e.g., as described in U.S. patent application Ser. No. 18/491,167 titled 'SYSTEM AND METHOD FOR DISTRIBUTED INTEGRITY MONITORING' filed 20 Oct. 2023 and incorporated in its entirety by this reference), integrity flags, and/or other suitable information (e.g., directly or indirectly; such as through a router, proxy, etc.; to a positioning engine). The information can be transmitted in the same or separate messages (e.g., a corrections message, integrity message, separate integrity messages for each monitor, etc.).

Determining a positioning solution S600 functions to determine a position (and/or higher order derivatives of position in time or vector components thereof) of a (often mobile) GNSS receiver. S600 is preferably performed by a local computing system (e.g., a positioning engine running on a processor collocated with the GNSS receiver), but can be performed by any suitable component (e.g., on a remote computing server).

The GNSS receiver positioning solution is preferably determined using corrected satellite observations (e.g., the positioning satellite observations received in S100 corrected using the corrections generated in S200), but can be determined using any suitable satellite observations (e.g., uncorrected satellite observations, differenced satellite observations, etc.). The satellite observations can be precorrected (e.g., before a filter processes the satellite observations to determine the GNSS receiver positioning solution), corrected in an estimator (such as a Kalman filter, extended Kalman filter, unscented Kalman filter, particle estimator, Gaussian process, etc.; where the GNSS corrections can be an input to the estimator), and/or can otherwise be corrected.

The positioning solution is preferably determined using carrier phase (e.g., ambiguity resolved carrier phase), but can additionally or alternatively be determined using pseudorange, doppler, and/or any suitable satellite signal(s). Determining the positioning solution can include determining the carrier phase ambiguity (e.g., to a floating point precision, to integer precision, etc. such as disclosed in U.S. patent application Ser. No. 16/817,196 filed 12 Mar. 2020 entitled "SYSTEMS AND METHODS FOR REAL TIME KINEMATIC SATELLITE POSITIONING" or in U.S. patent application Ser. No. 17/022,924 filed 16 Sep. 2020 entitled "SYSTEMS AND METHODS FOR HIGH-INTEGRITY SATELLITE POSITIONING," each of which is incorporated in its entirety by this reference), determining a set of floating phase ambiguity hypotheses, determining a set of integer phase ambiguity hypotheses from the set of floating phase ambiguity hypotheses, performing hypothesis testing to validate the set of integer phase ambiguities hypotheses, and/or any suitable steps.

S600 can include determining protection levels (e.g., where the positioning solution can be compared to the protection levels such as to ensure that the GNSS receiver is operating in a safe condition with at least a threshold probability). The protection levels are typically determined on a local computing system, but can be determined on a remote computing system and/or using any suitable computing system. The protection levels (e.g., bounds in the position domain; in contrast to the bias or REM typically refers to a bound in the range domain) are preferably determined from the fit coefficients (e.g., from S500 such as evaluated for a predetermined, application-specific, user selected, etc. integrity risk). However, the protection levels can be determined from any suitable information. In a first illustrative example, the protection level can be computed using a bias propagation method such as according to $$xPL = \sum |S| \cdot \mu_i + K \cdot \sqrt{\sum S^2 \cdot \sigma_i^2} = \left( \frac{\sum |S|}{\sqrt{\sum S^2}} \cdot \mu + K \cdot \sigma \right) \sqrt{\sum S^2}.$$

In a second illustrative example, the protection level can be computed using a sigma equivalent such as according to $$xPL = K \cdot \sqrt{\sum S^2 \cdot \left(\frac{\mu_i}{K} + \sigma_i\right)^2}.$$

In a third illustrative example, a less conservative propagation can be used such as a propagation that removes an average REM (e.g., average bias such as $$xPL = \sum |S| \cdot (\mu_i - \overline{\mu}) + K \cdot \sqrt{\sum S^2 \cdot \sigma_i^2})$$

and/or the REM terms (e.g., fit values) can be optimized for apportionment in the position domain (e.g., rather than the range domain). However, the protection levels can be determined in any manner. In some variants, the protection levels can additionally or alternatively be determined as disclosed in U.S. patent application Ser. No. 17/873,068 titled 'SYSTEM AND METHOD FOR COMPUTING POSITIONING PROTECTION LEVELS' filed 25 Jul. 2022, which is incorporated in its entirety by this reference.

In an illustrative example, the method can include: determining a conditional distribution of a monitor given a residual correction error; iteratively for Do each $P_{md}$(IR) allocation determining a monitor $P_{fa}$ (probability of false alarm) driven threshold using a convolution of the conditional distribution of the monitor and a distribution of residual correction error (e.g., where the residual correction error does not need to be conservative as it is impacting the monitor's $P_{fa}$) and computing the residual error magnitude (REM) when the $P_{md}$ allocation is met at the $P_{fa}$ driven threshold to determine the bound that can be checked for the $P_{md}$ allocation; and determining fit coefficients ($\mu$ and $\sigma$) such that $\mu + K$(IR)$\cdot\sigma$>=REM(IR) for all IR in the range. In variants of this illustrative example, the $P_{md}$ for each integrity risk can be allocated according to $IR_{req}$=P(Error>Bound & no alert)≥P(Error>Bound)·$P_{MD}$(Int chain) and the integrity risk can be allocated as $IR_{pred}$=P(Error>Bound)<$10^{-2}$/ SV/h (e.g., to ensure that the bounds are or minimum bound is sufficiently large with respect to the $10^{-2}$/hr percentile). In this illustrative example, the fit coefficients can be transmitted to a GNSS receiver which can determine a protection level (e.g., for a target integrity risk based on the GNSS receiver operation).

However, the method can include any suitable steps or processes.

In a first illustrative example, a method can include receiving global navigation satellite signal (GNSS) corrections, determining a corrections monitor probability distribution associated with a corrections monitor, for each integrity risk of a plurality of integrity risks: determining a probability of false alarm driven threshold associated with the corrections monitor probability distribution and determining a residual error magnitude such that a probability of missed detection is met at the false alarm driven threshold, and fitting the residual error magnitudes with a bound function that is greater than or equal to the residual error magnitudes for each integrity risk of the plurality of integrity risks. Variations of the method can further include at the corrections monitor, generating a flag indicating whether GNSS corrections errors exceed the bound function. In variations of this specific example, generating the flag can include: determining a residual between satellite observations received from a set of reference stations; and comparing the residual to a monitoring threshold derived from the bound function; where the flag can indicate that the GNSS corrections do not exceed the bound function when the residual is less than or equal to the monitoring threshold and where the flag can indicate that the GNSS corrections exceed the bound function when the residual is greater than the monitoring threshold. In variations of this specific example, a minimum residual error magnitude can be determined relative to a $10^{-2}$/hr percentile of the corrections monitor probability distribution. In variations of this specific example the bound function can be a linear function of the form (residual error magnitudes)≤$\mu + K\sigma$, where K is a constant that can depend on a target integrity risk. In variations of this illustrative example $\mu$ and $\sigma$ can be transmitted to a positioning engine, wherein the method can further include at the positioning engine: determining a bound associated with the GNSS corrections based on a target integrity risk associated with the positioning engine; determining a positioning solution of a GNSS receiver based on satellite observations tracked by the GNSS receiver; and comparing the positioning solution to the bound to determine whether the positioning solution meets a threshold probability for being safe to use. In variations of this specific example determining the positioning solution can include: correcting the satellite observations tracked by the GNSS receiver using the GNSS corrections; and determining integer-valued carrier phase ambiguities for carrier phases of the satellite observations tracked by the GNSS receiver, where the positioning solution is determined based on the integer-valued carrier phase ambiguities. In variations of this specific example K can be constrained to between 3.89 and 5.74. In variations of this specific example determining the corrections monitor probability distribution can include: predicting which satellites will be in-view of a reference station providing satellites observations to the corrections monitor; and determining the corrections monitor probability distribution based on the predicted satellites and a set of feared events. In variations of this specific example, the GNSS corrections and the bound function are determined by a corrections generator, where the corrections generator operates on a separate processor from the corrections monitor. In variations of this specific example, the GNSS corrections can include state space representation corrections for satellite clock errors, satellite code bias, satellite carrier bias, satellite orbit errors, and atmospheric delays.

In a second specific example a system for determining GNSS corrections and bounds can include: a corrections generator configured to: determine the GNSS corrections based on a set of satellite observations received from a set of reference stations; determine the bounds associated with the GNSS corrections; and an integrity monitor configured to determine whether the GNSS corrections exceed the bounds with a probability greater than an allocated integrity risk for the GNSS corrections to exceed the bounds; where the corrections generator is configured to determine the bounds based on a predicted ability of the integrity monitor to monitor the GNSS corrections. In variations of the second specific example, the system can include a positioning engine configured to determine a GNSS receiver position by processing a set of satellite observations corrected using the GNSS corrections. In variations of the second specific example, processing the set of satellite observations can include determining integer-valued carrier phase ambiguities for the set of satellite observations. In variations of the second specific example, the corrections generator and the integrity monitor can be implemented on a cloud processor remote from the GNSS receiver and where the positioning engine can be implemented on a processor collocated with the GNSS receiver. In variations of the second specific example, the GNSS corrections can include state space representation corrections for satellite clock errors, satellite code bias, satellite carrier bias, satellite orbit errors, and atmospheric delays. In variations of the second specific example, the bound can be determined as a linear function according to bound$\leq \mu + K\sigma$, where K is a constant that depends on a target integrity risk. In variations of the second specific example, K can be constrained to between 3.89 and 5.74. In variations of the second specific example, the corrections generator can be configured to determine the GNSS corrections using a Gaussian process operating without combining satellite observations. In variations of the second specific example, the corrections generator can be configured to generate a minimum bound based a $10^{-2}$/hr percentile of an integrity monitor probability distribution.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method comprising:
receiving global navigation satellite signal (GNSS) corrections;
determining a corrections monitor probability distribution associated with a corrections monitor, wherein the corrections monitor probability distribution comprises probabilities of GNSS correction errors for the GNSS corrections;
for each integrity risk of a plurality of integrity risks:
determining an error detection threshold based on a probability of false alarm associated with the corrections monitor probability distribution;
determining a residual error magnitude of a GNSS correction error of the GNSS corrections errors, that misses detection given the error detection threshold and the respective integrity risk; and fitting the residual error magnitudes with a bound function, wherein every value of the bound function is greater than or equal to the residual error magnitudes for each integrity risk of the plurality of integrity risks;
based on the bound function and the GNSS corrections, determining a GNSS receiver position of a GNSS receiver; and
reorienting the GNSS receiver based on the determined GNSS receiver position.

2. The method of claim 1, further comprising at the corrections monitor, generating a flag indicating whether GNSS corrections errors exceed the bound function.

3. The method of claim 2, wherein generating the flag comprises:
determining a residual over time between satellite observations received from a set of reference stations; and
comparing the residual over time to a monitoring threshold; wherein the flag indicates that the GNSS corrections do not exceed the bound function when the residual over time is less than or equal to the monitoring threshold and wherein the flag indicates that the GNSS corrections exceed the bound function when the residual over time is greater than the monitoring threshold.

4. The method of claim 1, further comprising determining a minimum residual error magnitude relative to a $10^{-2}$/hr percentile of the corrections monitor probability distribution.

5. The method of claim 1, wherein the bound function is a linear function of the form (residual error magnitudes)$\leq \mu + K\sigma$, where K is a constant that depends on a target integrity risk.

6. The method of claim 5, wherein $\mu$ and $\sigma$ are transmitted to a positioning engine, wherein the method further comprises at the positioning engine:
determining a bound associated with the GNSS corrections based on a target integrity risk associated with the positioning engine;
determining a positioning solution of a GNSS receiver based on satellite observations tracked by the GNSS receiver; and
comparing the positioning solution to the bound to determine whether the positioning solution meets a threshold probability for being safe to use.

7. The method of claim 6, wherein determining the positioning solution comprises:
correcting the satellite observations tracked by the GNSS receiver using the GNSS corrections; and
determining integer-valued carrier phase ambiguities for carrier phases of the satellite observations tracked by the GNSS receiver, wherein the positioning solution is determined based on the integer-valued carrier phase ambiguities.

8. The method of claim 5, wherein K is constrained to between 3.89 and 5.74.

9. The method of claim 1, wherein determining the corrections monitor probability distribution comprises:
predicting which satellites will be in-view of a reference station providing satellites observations to the corrections monitor; and
determining the corrections monitor probability distribution based on the predicted satellites and a set of feared events.

10. The method of claim 1, wherein the GNSS corrections and the bound function are determined by a corrections generator, wherein the corrections generator operates on a separate processor from the corrections monitor.

11. The method of claim 1, wherein the GNSS corrections comprise state space representation corrections for satellite clock errors, satellite code bias, satellite carrier bias, satellite orbit errors, and atmospheric delays.

12. A system for determining GNSS corrections and bounds associated therewith comprising:

a corrections generator communicatively coupled to a set of reference stations and an integrity monitor, wherein the corrections generator is configured to:

receive a set of satellite observations from the set of reference stations;

determine the GNSS corrections based on the set of satellite observations from the set of reference stations;

determine the bounds associated with the GNSS corrections; and the integrity monitor, wherein the integrity monitor is configured to determine whether a probability that the GNSS corrections exceed the bounds is greater than an allocated integrity risk, wherein the allocated integrity risk is a predetermined probability for the GNSS corrections to exceed the bounds;

wherein the corrections generator is configured to determine the bounds based on a predicted monitoring performance of the integrity monitor for determining whether the GNSS corrections exceed the bounds, wherein a GNSS receiver position is determined based on the GNSS corrections and the bounds, and where in the GNSS receiver is reoriented based on the GNSS receiver position.

13. The system of claim 12, further comprising a positioning engine communicatively coupled to the corrections generator configured to determine a position of a GNSS receiver by processing a set of satellite observations mea-sured by the GNSS receiver and corrected using the GNSS corrections determined by the corrections generator.

14. The system of claim 13, wherein processing the set of satellite observations measured by the GNSS receiver comprises determining integer-valued carrier phase ambiguities for the set of satellite observations measured by the GNSS receiver.

15. The system of claim 13, wherein the corrections generator and the integrity monitor are implemented on a cloud processor remote from the GNSS receiver and wherein the positioning engine is implemented on a processor collocated with the GNSS receiver.

16. The system of claim 12, wherein the GNSS corrections comprise state space representation corrections for satellite clock errors, satellite code bias, satellite carrier bias, satellite orbit errors, and atmospheric delays.

17. The system of claim 12, wherein the bound is determined as a linear function according to bound$\leq\mu+K\sigma$, where K is a constant that depends on a target integrity risk.

18. The system of claim 17, wherein K is constrained to between 3.89 and 5.74.

19. The system of claim 12, wherein the corrections generator is configured to determine the GNSS corrections using a Gaussian process, wherein the Gaussian process operates on the set of satellite observations measured by the set of reference stations independently without combining satellite observations.

20. The system of claim 12, wherein the corrections generator is configured to generate a minimum bound based on a $10^{-2}$/hr percentile of an integrity monitor probability distribution received from the integrity monitor.

* * * * *